(12) United States Patent
Liang

(10) Patent No.: US 7,035,275 B2
(45) Date of Patent: Apr. 25, 2006

(54) NON-COLLABORATIVE MECHANISMS FOR ENHANCED COEXISTENCE OF WIRELESS NETWORKS

(75) Inventor: Jie Liang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 977 days.

(21) Appl. No.: 10/026,317

(22) Filed: Dec. 20, 2001

(65) Prior Publication Data

US 2002/0122405 A1    Sep. 5, 2002

Related U.S. Application Data

(60) Provisional application No. 60/262,008, filed on Jan. 16, 2001.

(51) Int. Cl.
*H04J 4/00* (2006.01)
(52) U.S. Cl. .............. 370/436; 370/330; 370/252; 370/478
(58) Field of Classification Search ........... 320/208, 320/335, 203, 430, 345, 344, 503, 466, 442, 320/487; 455/450, 447, 69, 453; 375/347, 375/148, 260, 295; 342/357.09, 357.06; 370/480, 401, 329, 478, 328, 278, 330, 252, 370/436; 382/100
See application file for complete search history.

(56) References Cited

U.S. PATENT DOCUMENTS

| | | | | |
|---|---|---|---|---|
| 5,371,734 A | * | 12/1994 | Fischer | 370/311 |
| 5,530,701 A | * | 6/1996 | Stillman et al. | 370/410 |
| 6,947,748 B1 | * | 9/2005 | Li et al. | 455/450 |
| 6,965,616 B1 | * | 11/2005 | Quigley et al. | 370/480 |
| 6,987,770 B1 | * | 1/2006 | Yonge, III | 370/401 |

* cited by examiner

*Primary Examiner*—John Pezzlo
(74) *Attorney, Agent, or Firm*—J. Dennis Moore; W. James Brady, III; Frederick J. Telecky, Jr.

(57) ABSTRACT

When wireless communications systems are operating in the same general area, collisions between their transmissions are bound to occur. The collisions reduce the performance in the networks. In some wireless communications systems that use a fixed or prespecified transmission frequency pattern, a look-ahead technique that investigates the quality of the communications channel at the upcoming transmission frequencies can be used to allow or disallow transmissions. Additionally, a maximum length of a transmission can be determined based on the quality of the transmission frequency. Finally, if the communications system is controlled by a centralized controller, moving the controller away from sources of interference will often improve performance.

16 Claims, 6 Drawing Sheets

NON-COLLABORATIVE MECHANISMS FOR ENHANCED COEXISTENCE OF WIRELESS NETWORKS

This application claims priority to the provisional application entitled "Proposal for Non-collaborative BT and 802.11B MAC Mechanisms for Enhanced Coexistence", filed Jan. 16, 2001, Ser. No. 60/262,008, which provisional application is incorporated herein by reference.

FIELD OF THE INVENTION

This invention relates generally to wireless communications networks, and particularly to mechanisms for enhancing the performance of wireless communications networks operating where there is interference from other wireless communications networks operating in the same general area.

BACKGROUND OF THE INVENTION

Radio frequency (RF) spectrum is a valuable commodity in today's world. There are more people desiring to use the RF spectrum than there is spectrum to go around, so use of the spectrum must be regulated. In many countries, the RF spectrum is regulated by governmental bodies. The Federal Communications Commission (FCC) regulates the RF spectrum in the United States.

The RF spectrum is regulated usually in one of two ways. A first way that governmental bodies regulate the RF spectrum is to sell portions of it to the highest bidder. The winning bidder then has exclusive use of the particular portion of the RF spectrum that he has just purchased. This is the way that RF spectrum for cellular telephones, television and radio channels are allocated. Single user allocations are the preferred method for applications where interference from other sources cannot be tolerated.

A second way that the government regulates RF spectrum usage is to create certain bands where anyone can use the RF spectrum as long as they comply with specified spectrum usage rules. For example, in the United States, the FCC has created three such bands. These bands are called the industrial, scientific, and medical (ISM) and the unified national information infrastructure (UNII) bands and are in the 900 MHz, 2.4 GHz, and 5.7 GHz portions of the RF spectrum. Anyone may use the spectrum in these bands as long as they are able to accept interference from other users and do not cause undue interference to other users.

The ISM and UNII bands have created a huge market for wireless consumer electronics products, such as cordless telephones, wireless computer products, and wireless computer networks. However, the popularity of the bands has resulted in a problem that many product developers did not anticipate, namely, performance degradation due to inter-product interference.

In wireless computer networks, the performance degradation is seen mainly in the network's data transfer rates. A wireless network today is capable of delivering a data transfer rate of 11 Mbps or more in an interference free environment, but if interference is introduced, the data transfer rate may drop to only a small fraction of the maximum.

Interference to a wireless computer network may come from many different forms. Sources of interference may include large appliances in the environment, other electronic devices such as pagers, cordless telephones, and microwave ovens, and other wireless computer networks. The relatively simple sources of interference such as appliances and pagers and telephones are relatively simple to deal with because their interference is periodic and is usually predictable. Because the interference is predictable, it is usually easy to avoid.

When multiple wireless computer networks are operating in the same general vicinity, the wireless networks can be interfere with one another. If the wireless computer networks are of the same type (the networks use a common technical standard), then there are often built-in mechanisms that permit the networks to remain operating at near optimal levels. However, if the wireless computers networks are of differing types, then there normally no built-in techniques that will permit the networks to work around each other.

Interference from wireless networks are more difficult to deal with due to the bursty nature of computer traffic and the fact the networks are often adaptive and can adjust their behavior depending on network conditions. The adaptive behavior often makes the interference worse because in many cases the network simply increases its transmission power when it detects a decrease in data rate. The increased transmission power results in a corresponding increase in the interference to other networks.

One proposed solution involves taking snapshots of the transmission spectrum and searching the snapshots to detect the presence of interference. When and if the interference can be detected and classified, the wireless communications network can alter its transmission behavior to circumnavigate the interference. However, due to the bursty nature network traffic, it is often the case that by the time an interferer has been detected, classified, and the network's behavior adjusted, the interferer has disappeared or moved to a different portion of the spectrum.

Another proposed solution involves the use of an arbitration unit (or a fixed priority scheme) to mediate between multiple wireless communications networks to reduce collisions between the transmissions of the various networks. In this solution, a prioritized list is used to allow transmissions of higher priority the ability to preempt transmissions of lower priority. Such a solution requires the use of additional hardware and software in order to coordinate the operation of the multiple wireless communications networks. Additionally, in the case of the fixed priority scheme, low-priority transmissions may be starved if the networks transmit too many high-priority transmissions.

A need has therefore arisen for a solution that allows multiple wireless communications networks operate within the same general vicinity without requiring collaboration between the wireless communications networks.

SUMMARY OF THE INVENTION

In one aspect, the present invention provides a method for transmitting information in a wireless network that is operating in an environment where other wireless networks are also operating comprising the steps of tuning a receiver to a frequency band of interest and measuring the quality of the communications channel at the frequency band of interest. From the measurements, a channel metric is calculated and compared against a threshold. Based on the comparison, the wireless network will decide to take action.

The present invention has many advantages. For example, use of a preferred embodiment of the present invention has an advantage in that the present invention provides a way to increase the performance of wireless communications networks operating in an environment where there are multiple wireless communications networks.

Also, a preferred embodiment of the present invention is adaptive and can change its behavior depending on the current network traffic load.

Additionally, a preferred embodiment of the present invention is fully compliant with several existing technical standards, and does not require any modification of or additions to hardware that is compliant to these technical standards, only modifications need to be made to the software controlling the hardware.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

Figure 1:
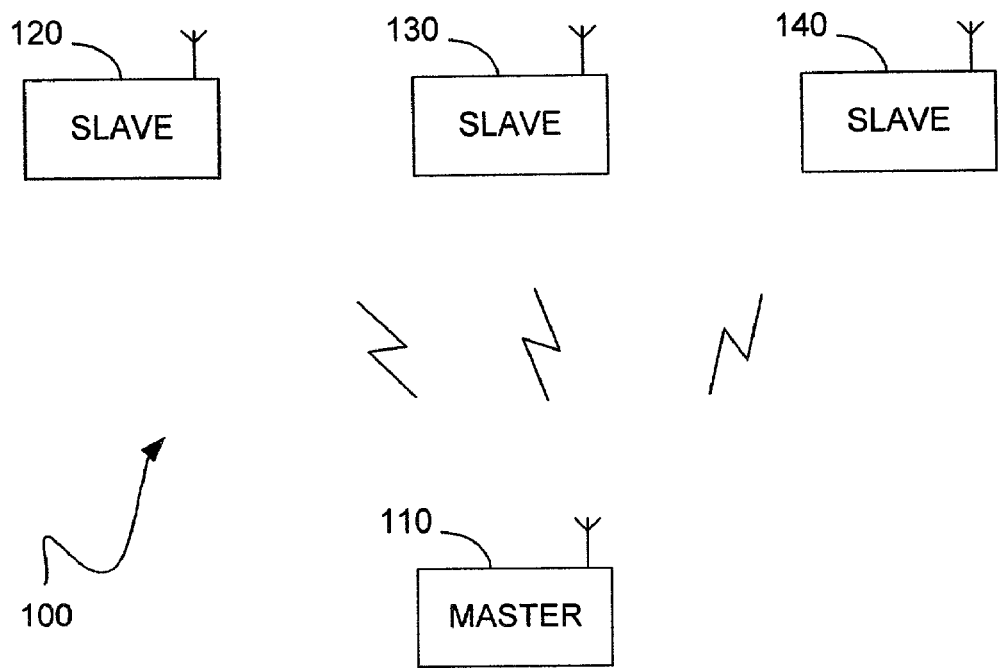
FIG. 1 illustrates a prior art diagram of a typical Bluetooth wireless network.

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Wireless networks have become extremely popular with users of digital equipment. They allow a degree of mobility and flexibility that has not been available until recently. A user with a digital device connected to a wireless network can roam freely within the operational range of the network without being encumbered by wires. Additionally, more sophisticated wireless networks permit configurations wherein multiple networks can be setup so that the user can transparently roam between the networks without noticing the change in networks taking place or needing to make any adjustments to the digital device.

However, the popularity of wireless networks has bred a large number of different types of wireless networks. Not only are these wireless networks usually incompatible with one another, they often interfere with one another's transmissions. When multiple wireless networks that use a common frequency band, such as the 2.4 GHz ISM band, share a common coverage range, collisions between transmissions can and do occur. When collisions occur, the data being transmitted is typically lost and recovery normally requires retransmission. Repeated retransmissions can reduce the data throughput of a network to a small fraction of its normal throughput levels.

Preferred embodiments of the present invention disclose methods for permitting multiple wireless networks that use the same frequency band to operate within the same general area. The method permits the networks to continuously operate without suffering a significant performance decrease by measuring the channel at a frequency where the network intends to transmit. If the quality of the channel at the frequency is good, then the network will transmit. While the discussion will specifically focus upon two specific types of wireless networks, namely networks that are compliant to the IEEE 802.11 and the Bluetooth technical standards, the ideas presented in the preferred embodiments of the present invention has application to other types of wireless networks. The preferred embodiments of the present invention also has applicability to a single wireless network operating in an environment that is noisy and is full of interference and other sources of errors. Therefore, the present invention should not be construed as being limited solely to the two types of wireless networks discussed herein.

A popular wireless network standard is the Bluetooth (BT) special interest group (SIG) technical standard. Specified in the "Specification Volume 1: Specification of the Bluetooth System, Version 1.1, Feb. 22, 2001," which is incorporated herein by reference. Bluetooth wireless networks are intended as replacements for low data-rate wired connections, such as parallel and serial connections, and universal serial bus connections between digital devices. As such, Bluetooth wireless networks are typically small area networks (a low transmission power level).

Referring now to FIG. 1, a diagram (prior art) of a typical wireless network configuration according to the Bluetooth SIG technical specifications. Note that FIG. 1 displays one possible configuration of a Bluetooth wireless network out of the many different configurations that are possible. FIG. 1 illustrates a Bluetooth wireless network 100 comprised of a master unit 110 and three slave units 120, 130, and 140. The master unit 110 is wirelessly connected to the three slave units. According to the Bluetooth SIG specifications, a slave unit cannot communicate unless it is specifically addressed in a packet from the master unit.

A Bluetooth wireless network provides two different communications modes. A first mode, referred to as synchronous connection oriented (SCO), simulates a circuit switch connection between a master unit and a slave unit. SCO communications are scheduled well in advance of the actual communications instances and occur at regular intervals. The master unit 210 will setup a SCO link between itself and a slave unit and at periodic intervals, the master unit 210 will transmit to the slave unit using a master->slave time slot, who in turn, will transmit a response in the following slave->master time slot.

A second mode, referred to as asynchronous connectionless (ACL), provides packet switched connections between a master unit and a slave unit(s). The master unit can transmit to a single slave or all slaves in a master->slave time slot. If a slave decodes that the transmission was intended for it (via decoding its address in the transmission), then it is permitted to transmit back to the master in the next slave->master time slot. There is no reply transmission if the transmission was not addressed to a specific slave, i.e., the transmission was a broadcast to all slave units. While most transmissions are one time slot long, ACL transmissions may also be three (3) or five (5) time slots long.

After each time slot, the transmission frequency of the Bluetooth network changes. If a transmission spans several time slots, the transmission frequency does not change until the transmission is complete. The changes to the transmission frequency follow a strict pattern that is specified in the Bluetooth technical standards. The constant changing of the transmission frequency is known as frequency hopping and is used to increase the wireless network's immunity to noise, errors, and interference.

A Bluetooth network operates in the 2.4 GHz ISM band and uses a frequency hopping, time-division duplex scheme with a slot length of 625 microseconds. The transmission pattern is as follows: the master unit and the slave units are granted alternating time slots. If a master unit is granted a time slot number 0, then the master unit can transmit during that time slot and all subsequent even numbered time slots. Time slots dedicated to the master unit are referred to as master->slave time slots. Slave unit(s) are then assigned time slot number 1 and then all subsequent odd numbered time slots. Time slots dedicated to the slave unit(s) are referred to as slave->master time slots.

Figure 2:
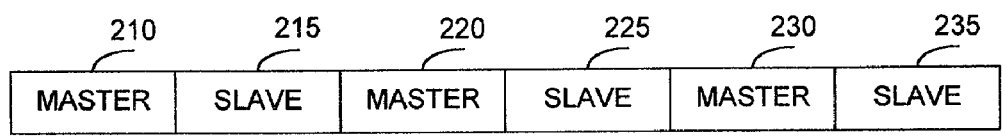
FIG. 2 illustrates a prior art diagram of a transmission frame structure of a Bluetooth wireless network.
Figure 2:

Referring now to FIG. 2, a diagram illustrates a transmission pattern 200 for a Bluetooth compliant wireless network. As discussed previously, Bluetooth wireless networks alternate transmissions. The master of the Bluetooth wireless network can transmit every other time slot, while the slave(s) can transmit in the time slots not assigned to the master. Although the slave(s) can transmit in the time slots not assigned to the master, the slave(s) cannot transmit unless it has received a message specifically addressed to it from the master. FIG. 2 displays three time slots 210, 220, and 230 that are assigned to the master and three time slots 215, 225, and 235 that are assigned to the slave(s).

Another type of wireless network are the wireless networks that are adherent to the IEEE 802.11 technical standard. The most common type of IEEE 802.11 wireless network, the IEEE 802.11b wireless network, operates in the 2.4 GHz ISM RF spectrum band and provides up to 11 Mbps of data transfer rate, while a more advanced version, IEEE 802.11a, operates in the 5.7 UNII band provides up to 54 Mbps of data transfer rate. The 802.11 wireless network is specified in a technical standard, "ANSI/IEEE Std 802.11, 1999 Edition; Information technology-Telecommunications and information exchange between systems-Local and metropolitan area networks—Specific requirements. Part 11: Wireless LAN Medium Access Control (MAC) and Physical Layer (PHY) Specifications" which is incorporated herein by reference.

Regardless of type, the transmission frequency of IEEE 802.11 wireless networks typically remains stationary. There is a variant of IEEE 802.11 wireless network that employs frequency hopping, but this variant is extremely rare and it is unlikely to be encountered in the real world. To increase an IEEE 802.11 wireless network's immunity to noise, errors, and interference, data that is being transmitted is spread across a larger frequency band than actually needed to transmit the data. By spreading the data, the designers reduce the effects noise, errors, and interference on the data. However, spreading can greatly increase the size of the frequency band required for the transmission (the footprint) depending on the amount of spreading. For example, an IEEE 802.11b wireless network operating in the 2.4 GHz ISM band occupies more than 20 percent of the total band. Therefore, when there are multiple wireless networks transmitting in the same band, especially when one of which is an IEEE 802.11 wireless network, there is a high probability of transmission collisions.

While a Bluetooth wireless network's frequency hopping increases its immunity to noise, errors, and interference, the fact that it rapidly changes frequency (up to once every 625 microseconds) and that it uses the entire 2.4 GHz ISM band, greatly increases the probability that collisions with IEEE 802.11 wireless networks (and other wireless networks) will take place. However, the combination of an agile frequency hopper (Bluetooth wireless network) with a relatively stationary transmitter (IEEE 802.11 wireless network) presents many opportunities to prevent the occurrence of collisions.

Figure 3:
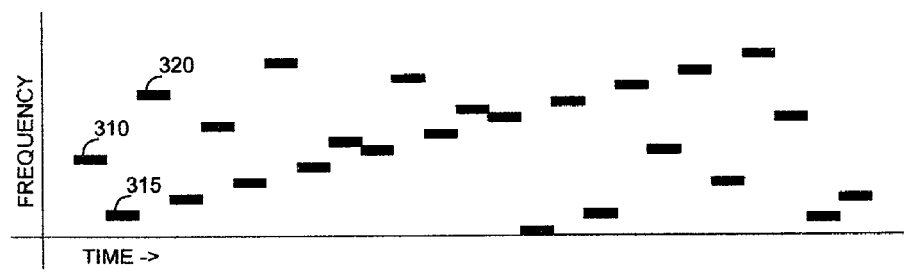
FIG. 3 illustrates a data plot displaying a typical frequency-hopping pattern used by a Bluetooth wireless network.

Referring now to FIG. 3, a data plot displays a time versus frequency plot of the transmission frequency of a Bluetooth wireless network that is representative of an actual frequency-hopping pattern used by a Bluetooth wireless network according to the Bluetooth technical standard. The data plot displays a series of solid rectangles, each rectangle representing a Bluetooth transmission frequency and time duration. Each solid rectangle represents a 625-microsecond duration of time. For example, a first solid rectangle 310 represents that if the Bluetooth wireless network were to transmit during its time slot zero, then it would use the transmission frequency corresponding to the first rectangle 310. A second solid rectangle 315 represents that if the Bluetooth wireless network were to transmit during its time slot one, then it would use the transmission frequency corresponding to the second rectangle 315. Note that FIG. 3 does not display an entire frequency-hopping pattern for a Bluetooth wireless network, nor does it display the entire 2.4 GHz ISM band, however, it is a good representation of the frequency-hopping behavior of the Bluetooth wireless network.

Due to the rapidly changing transmission frequency that does not dwell around any particular portion of the frequency band for long, a Bluetooth wireless network's transmissions do not remain within another wireless network's footprint for an extended amount of time. If during a particular time slot, the Bluetooth wireless network's transmission would lie within a footprint of another wireless network, it is very likely that within the next few time slots, the Bluetooth wireless network's transmission would not lie within the footprint of the same wireless network.

Figure 4:
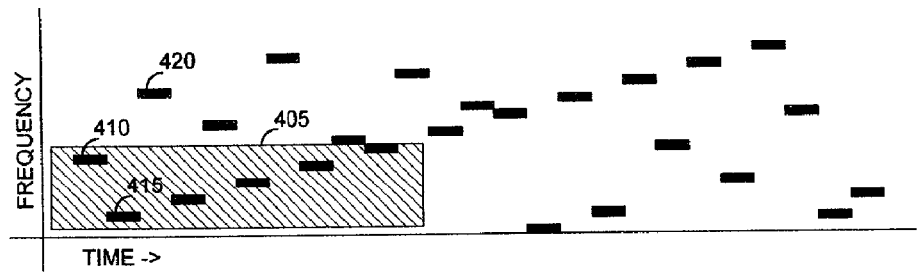
FIG. 4 illustrates a data plot displaying a typical frequency-hopping pattern used by a Bluetooth wireless network overlaid with a transmission from another wireless network.

Referring now to FIG. 4, a data plot displays a time versus frequency plot of the transmission frequency of a Bluetooth wireless network that is representative of an actual frequency-hopping pattern used by a Bluetooth wireless network according to the Bluetooth technical standard and a spectral footprint of another wireless network. The data plot displays a spectral footprint 405 of another wireless network that occupies a considerable portion of the available frequency band. The data plot also displays a first 410 and second 415 solid rectangle, representing Bluetooth transmission frequencies for time slots zero and one respectively. Clearly, if the Bluetooth wireless network transmits during either of the first two time slots, collisions would occur between the transmissions from the Bluetooth wireless network and the other wireless network.

However, FIG. 4 displays a third solid rectangle 420 (associated with a third time slot) that lies outside of the footprint 405. If the Bluetooth wireless network were to transmit during this third time slot, then a collision would not occur between transmissions from the Bluetooth wireless network and the wireless network whose transmission is displayed as the footprint 405. FIG. 4 goes on to display that several subsequent transmissions from the Bluetooth wireless network will result in collisions, and some others that will not.

Given that a Bluetooth wireless network follows a fixed, periodic frequency-hopping pattern that is based on the address of the master unit, it is possible to determine prior to an actual transmission, the transmission frequency of the transmission. According to the Bluetooth technical standard, the transmission frequency is determined based upon the clock of the master unit.

Figure 5:
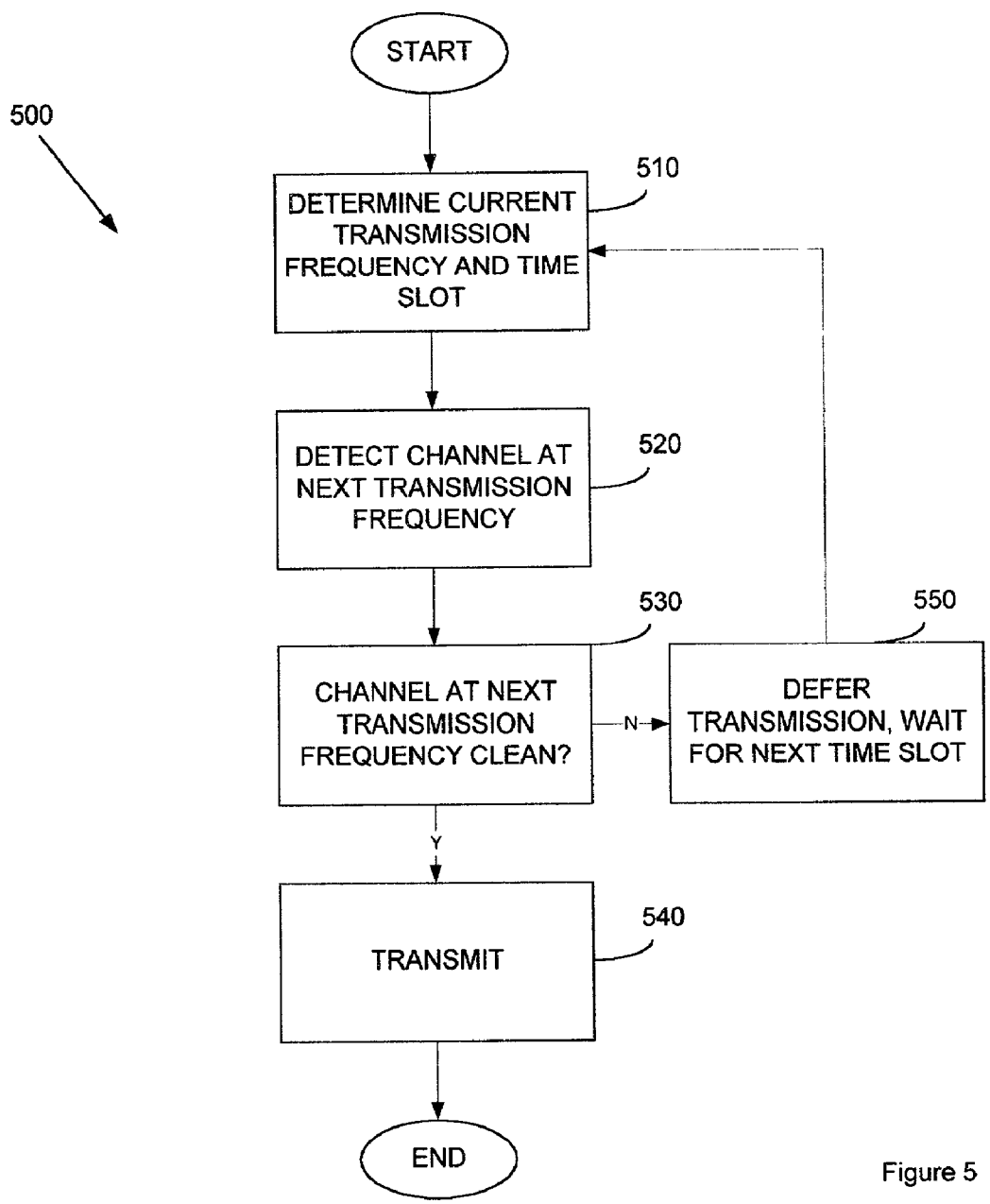
FIG. 5 illustrates a flow diagram displaying an algorithm for use in reducing the occurrence of transmission collisions according to a preferred embodiment of the present invention.

Referring now to FIG. 5, a flow diagram illustrates an algorithm 500 for use in reducing the occurrence of transmission collisions according to a preferred embodiment of the present invention. According to a preferred embodiment of the present invention, the algorithm 500 would execute on the master unit of a Bluetooth wireless network. The master unit would begin by using its clock to determine the current transmission frequency and time slot (510). Using this information, the master unit can determine the transmission frequency of the next time slot. By tuning its receiver to the transmission frequency of the next time slot, the master unit is able to detect the channel at the next transmission frequency (520) and use the detected information to generate a channel metric of channel at the transmission frequency. Since the frequency-hopping pattern is periodic, the snapshot could also be derived from previous transmissions at the desired transmission frequency.

The master unit records any signals, noise, and interference received at the next transmission frequency. Ideally, the next transmission frequency will have no signals, noise, and interference at all, with the exception of a minimal level of noise that represents the noise floor. The noise floor is significantly smaller in magnitude than any transmission and can effectively be ignored. An example channel metric may be an averaging of received signals within the transmission frequency. If the transmission frequency were free of other signals and errors, then the average would be equal to the noise floor. The more signals, errors, and sources of interference there are in the transmission frequency, the larger the average value. Alternatively, other examples of the channel metric include integrating the received signal level over the transmission frequency and adding the received signal level over the transmission frequency.

Using an agreed upon threshold, the master unit will determine if the channel at the next transmission frequency is clean enough to allow the transmission to occur (530). The master unit determines this by comparing the channel metric against the agreed upon threshold. If the master unit determines that the channel is clean enough, then it will allow the transmission to occur (540) and if the master unit determines that there is too much errors, noise, and interference on the channel, then it will not allow the transmission to occur (550). If the transmission is not allowed to occur, then the master unit must defer the transmission to a later time and return at that later time to determine if the deferred transmission can take place.

The threshold used in the determination of channel cleanliness in step 530 may be as simple as a single value and the decision may be as simple as if the channel metric exceeds the threshold, then do not transmit and if the channel metric is less than the threshold, then do transmit. Alternatively, the decision may be more complex and be based on a history of how many times in the past that transmissions in the particular transmission frequency has succeeded or failed, how many times this particular transmission has been attempted and failed, the spectral history of the particular transmission frequency, etc.

According to another preferred embodiment of the present invention, the algorithm 500 only executes when there is a transmission scheduled. If there is no transmission scheduled, then the master unit will not execute the algorithm 500. According to yet another preferred embodiment of the present invention, the master unit will look ahead more than one time slot (transmission frequency). By examining several subsequent transmission frequencies, the master unit may be able to reduce the number of times it has to re-execute the algorithm 500 and be able to go ahead and schedule the transmission with high probability that the transmission will succeed.

According to another preferred embodiment of the present invention, the master unit continually monitors transmission frequencies. It performs the monitoring even if there are no scheduled transmissions. By continually monitoring the spectrum, the master unit is able to generate a spectral history for the different transmission frequencies. It can then use the spectral history when it is scheduling a transmission. For example, a transmission frequency may currently be clean, but the usage history may say that the particular transmission frequency is plagued with periodic interference. Based on the usage history, the master unit may decide to never schedule a transmission in that particular transmission frequency or to only schedule short transmissions that will fit within the periods of interference.

According to the Bluetooth technical standard, a transmission may be one, three or five time slots in length and the data payload may be protected (or not) by several different data encoding schemes. The header portion of a transmission may also be protected through the use of a header error check (HEC). Assuming a constant probability of collision, the longer (in time) a transmission is, the greater the probability of collision. Protecting the transmission through the use of a data-encoding scheme is an effective way to protect the data payload from errors, however, it is not without cost. The use of data encoding to protect the data payload from errors reduces the amount of data that a fixed-sized data payload can transmit. According to the Bluetooth technical standard, a five time slot long transmission can transmit up to 339 bytes of information when the data payload is not encoded, while the same length transmission can transmit up to only 224 bytes of information if the data is protected with a particular data encoding scheme.

Figure 6:
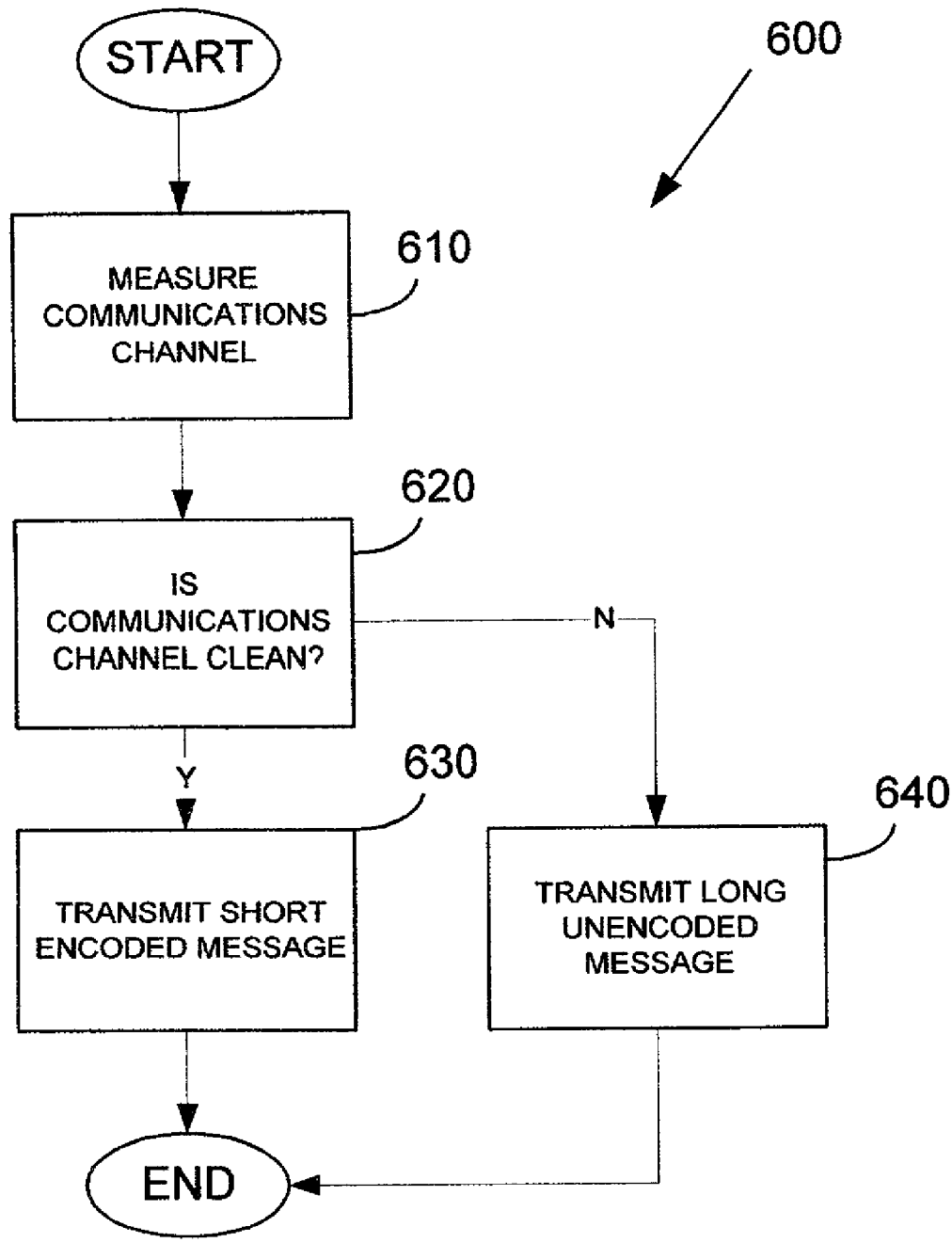
FIG. 6 illustrates a flow diagram displaying an algorithm for use in determining a transmission's overall length and data encoding level according to a preferred embodiment of the present invention.

Referring now to FIG. 6, a flow diagram illustrating an algorithm 600 for determining a transmission's length and data encoding level according to a preferred embodiment of the present invention. In the discussion of FIG. 5, an algorithm for scheduling of a transmission is presented. Algorithm 600 presents a method for determining the length of the transmission and the use of data encoding to protect the data (and header). According to a preferred embodiment of the present invention, the algorithm 600 executes on a master unit of the Bluetooth wireless network. However, like the algorithm discussed in FIG. 5, the algorithm 600 may also execute on slave units as well.

The master unit begins by measuring the communications channel at the transmission frequency of interest (610).

According to a preferred embodiment of the present invention, the transmission frequency of interest is the transmission frequency of the time slot immediately following the current time slot. According to another preferred embodiment of the present invention, the master unit may use the channel measurement previously made during the scheduling of the transmission. In any case, after obtaining the channel measurement, the master unit generates a channel metric based on the channel measurement. Examples of typical channel metrics were discussed previously.

After determining the channel metric, the master unit determines if the channel is clean (620). According to a preferred embodiment of the present invention, the determination may be made by comparing the channel metric against a specified threshold. The comparison may be a simple greater than/less than comparison, it may be a more complex multi-valued comparison, it may even be a fuzzy logic type of comparison, or it may use history information regarding the transmission and/or the transmission frequency. If the channel is determined to not be clean, then the master unit will allow only the transmission of a short message that is protected by a data-encoding scheme (630). A short message reduces the probability of a collision because it remains in the network for a smaller amount of time, while the data encoding will increase the probability of recovering the data in the transmission even if a collision occurs.

If the channel is determined to be clean, then the master unit will allow the transmission of a long message that is not protected by a data-encoding scheme (640). Since the channel metric did not exceed the threshold, the spectrum of the channel at the transmission frequency was relatively error and interference free. Therefore, is desirable to maximize the amount of data transmitted by the transmission. The maximization of the data transfer rate is achieved by maximizing the transmission length and not using any data encoding.

According to another preferred embodiment of the present invention, the results of the "is the channel clean determination" (comparison of the channel metric with the threshold) is used to determine the length of the transmission and the strength of the data (and header) encoding used. If the channel metric exceeds the threshold by a large margin (there is a lot of interference), then the transmission is made to be very short and the data encoding used is the maximum available. If the channel metric exceeds the threshold by a small margin (the channel is not clean), then the transmission is made to be a medium length transmission and the data encoding provides a small amount of protection. If channel metric does not exceed the threshold (the channel is clean), then the transmission length is maximized and will use no data encoding.

According to yet another preferred embodiment of the present invention, the algorithms presented in FIGS. 5 and 6 can be combined to provide a single method of scheduling transmissions and determining the maximum allowed transmission length and data encoding based on the channel metric at the transmission frequency. The combined algorithm will be able to determine when to schedule a transmission and if the transmission is scheduled, what the length of the transmission should be and if protection for the data (and header) in the transmission should be used.

Using a simple free-space model, the over-the-air propagation of radio frequency signals is inversely proportional to the square of the distance between the source and the destination. In other words, a first destination that is twice as far away from the source as a second destination will receive the transmitted signal at one-fourth of the power level that the second destination receives. This relationship can be expressed as:

$$\text{received power} \propto \frac{1}{r^2}$$

where r is the distance between the source and the destination. In an indoor environment where multipath fading is dominant, the decay exponential is even larger, on the order of 3 or 4.

In a Bluetooth wireless network, where all traffic originates from or is destined for the master unit, it is advantageous to have the master unit as far away from sources of errors, noise and interference as possible. By having the master unit located as far from the sources of errors, noise, and interference as possible, the detrimental effect of the errors and interference is minimized per the $1/r^2$ relationship.

Figure 7:
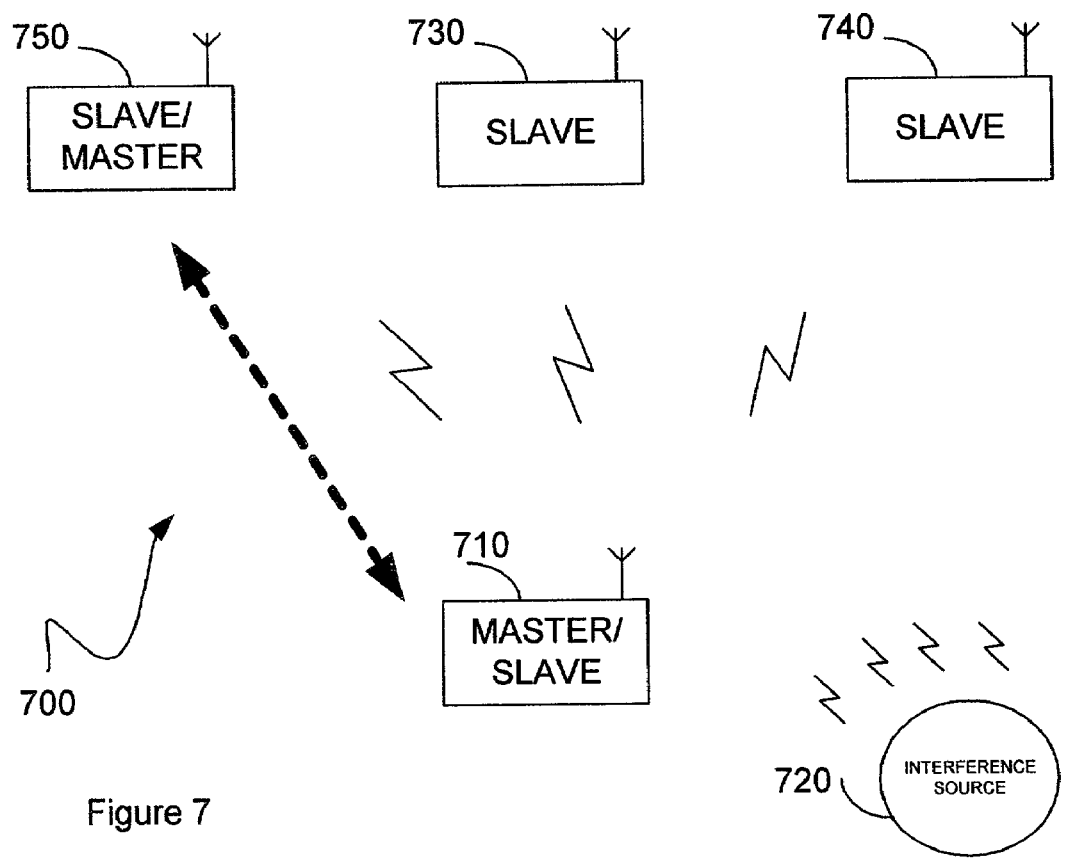
FIG. 7 illustrates a Bluetooth wireless network operating near an interference source and a master-slave switch performed in accordance with a preferred embodiment of the present invention.

Referring now to FIG. 7, a diagram illustrates a Bluetooth wireless network 700 located near an interference source 720 according to a preferred embodiment of the present invention. The Bluetooth wireless network 700 is controlled by a master unit 710 and has three slave units 730, 740, and 750. Adjacent to the master unit 710 is the interference source 720 that is creating a significant problem to the transmissions originating from and coming to the master unit 710. The interference source 720 is a major problem because of its proximity to the master unit 710.

The master unit 710 may be able to detect that it is adjacent to the interference source 720 by measuring the bit-error rate (BER), frame-error rate (FER), received signal strength indicator (RSSI), etc., of transmissions that it is transmitting and receiving. A strong interference source is easy to detect through the measure of signal strength. The master unit can then compare the metrics with similar metrics from the slave units. By comparing the above mentioned communications channel quality indicators with the same indicators from the slave units, the master unit 710 (and the slave units) will be able to determine which unit between them has the best signal quality. In FIG. 7, slave unit 750 will most likely have the best signal quality because it is the furthest away from the interference source 720 (remember the $1/r^2$ relationship between distance and received power). The master unit 710 and the slave unit with the best signal quality (slave unit 750 in FIG. 7) will then initiate a master-slave switch. After the switch, the master unit 710 becomes a slave unit while the slave unit 750 becomes the new master unit of the Bluetooth wireless network 700. Note that the unit with the best signal quality may not be the best candidate for a master-slave switch. Some slave unit types cannot become masters. Accordingly, the master-slave switch should be performed between the master unit and a slave unit that has the lowest interference metric and capable of performing as a master unit.

Figure 8:
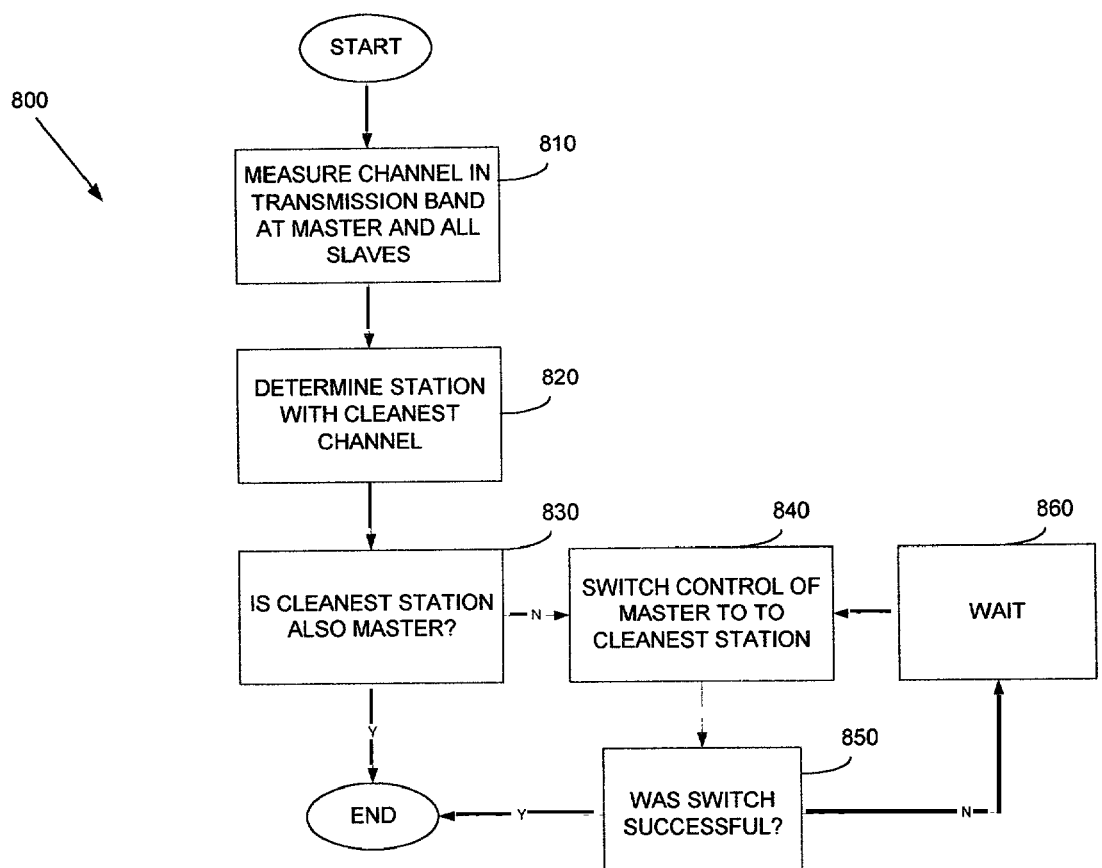
FIG. 8 illustrates a flow diagram displaying an algorithm for use in determining the need for and initiating a master-slave switch in a Bluetooth wireless network according to a preferred embodiment of the present invention.

Referring now to FIG. 8, a flow diagram illustrates an algorithm 800 for determining and initiating a master-slave switch in a Bluetooth wireless network according to a preferred embodiment of the present invention. According to a preferred embodiment of the present invention, a copy of the algorithm 800 executes on the master unit with a variant of the algorithm 800 executing on the slave units of a Bluetooth wireless network. According to a preferred embodiment of the present invention, the variant of the algorithm 800 executing on the slave units is capable of measuring the channel within the transmission band, but it is not capable of initiating a master-slave switch.

A master unit with the algorithm 800 executing on it begins by measuring the channel within the transmission band (810). According to another preferred embodiment, the unit executing the algorithm 800 does not have to be a master unit, any one of the units in the Bluetooth wireless network may execute the algorithm 800 or its variant. In fact, it is preferable that all units capable of performing a master-slave switch execute the algorithm 800 or a slave variant of the algorithm.

The measurement of the channel can be made by measuring the bit-error rate (BER), frame-error rate (FER), received signal strength indicator (RSSI), etc. Alternatively, a more complex metric can be used to determine the quality of the channel within the transmission band. An example of such a metric would be one that takes into account the history of the channel and analyze the history to predict when interference will occur. Slave units, executing a variant of the algorithm, would also be measuring the channel within the transmission band. After other units within the Bluetooth wireless network have performed the same measurement, the information is exchanged, preferably by transmitting the various channel measurements to the master unit. The master unit determines the unit with the cleanest channel (820). In most cases, the unit with the cleanest channel is also the unit that that is the furthest away from any sources of errors, noise, and interference.

The master unit then checks to see if it is the unit with the cleanest channel (830). If the master unit is the unit with the cleanest channel, then a master-slave switch does not have to be performed and the algorithm 800 terminates. If the master unit is not the unit with the cleanest channel, then a master-slave switch should be performed (840). As discussed earlier, the unit with the cleanest channel is not necessarily the best candidate for the master-slave switch, since some units are not capable of performing the switch. Therefore, the master unit must determine the unit with the cleanest channel that is capable of performing the master-slave switch.

After initiating the master-slave switch, the master unit checks to see if the switch was performed successfully (850). If the switch was successful, then the algorithm 800 terminates. If the switch was not successful, then the master unit will wait a specified amount of time (860) and reattempt the master-slave switch. By waiting a specified amount of time, whatever caused the failure of the master-slave switch may have passed or resolved itself and the switch will be able to succeed on retry.

According to a preferred embodiment of the present invention, if the master-slave switch failed (850), the master unit would not continue to attempt to try to perform the switch. Part of the process in performing the master-slave switch involves transmission of control packets between the master and the slave units involved in the switch. If some of the packets were not able to make it to their intended destinations due to a particularly noisy environment, then that may have been the cause of the failure of the master-slave switch. Repeated attempts in initiating the master-slave switch would only result in additional network traffic and further failures.

Alternatively, the master unit may decide to wait an amount of time that it determines independently based on the quality of the channel that it itself has measured and any history information it may have. The master unit may decide to wait only a small amount of time if the quality of the channel is not very bad or it may wait an extended amount of time if the channel is particularly bad.

Figure 9:
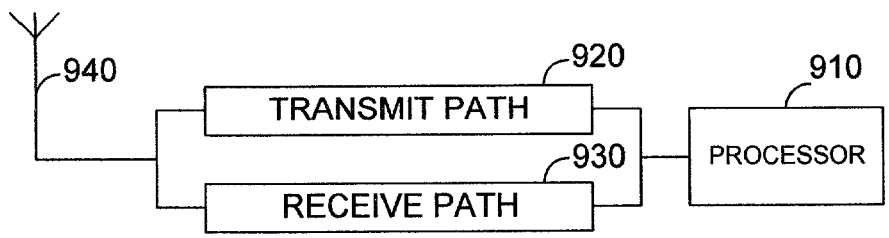
FIG. 9 illustrates a wireless unit that may be a part of a Bluetooth wireless network.

Referring now to FIG. 9, a diagram illustrates a wireless unit that can be part of a Bluetooth wireless network. FIG. 9 displays a typical wireless unit that can function as either a master unit or a slave unit in a Bluetooth wireless network. The wireless unit comprises a processor 910, a transmit path 920, a receive path 930, and an antenna 940. The processor 910 is responsible for processing data received over-the-air by the antenna 940 and converted into a digital data stream by the receive path 930. The processor 910 is also responsible for generating a digital data stream for transmission purposes that is converted into a transmittable form by the transmit path 920 and transmitted using the antenna 940.

According to a preferred embodiment of the present invention, functions performed by the processor 910 include, but is not limited to: partitioning messages to fit within packet limits, scheduling the transmission of the packets, calculating the transmission frequency based on a timing reference, and generating metrics for use in determining communications channel quality. The functions can be implemented in as software functions stored in executable memory, firmware stored in read-only memory, or custom circuitry implemented in silicon.

Figure 10:
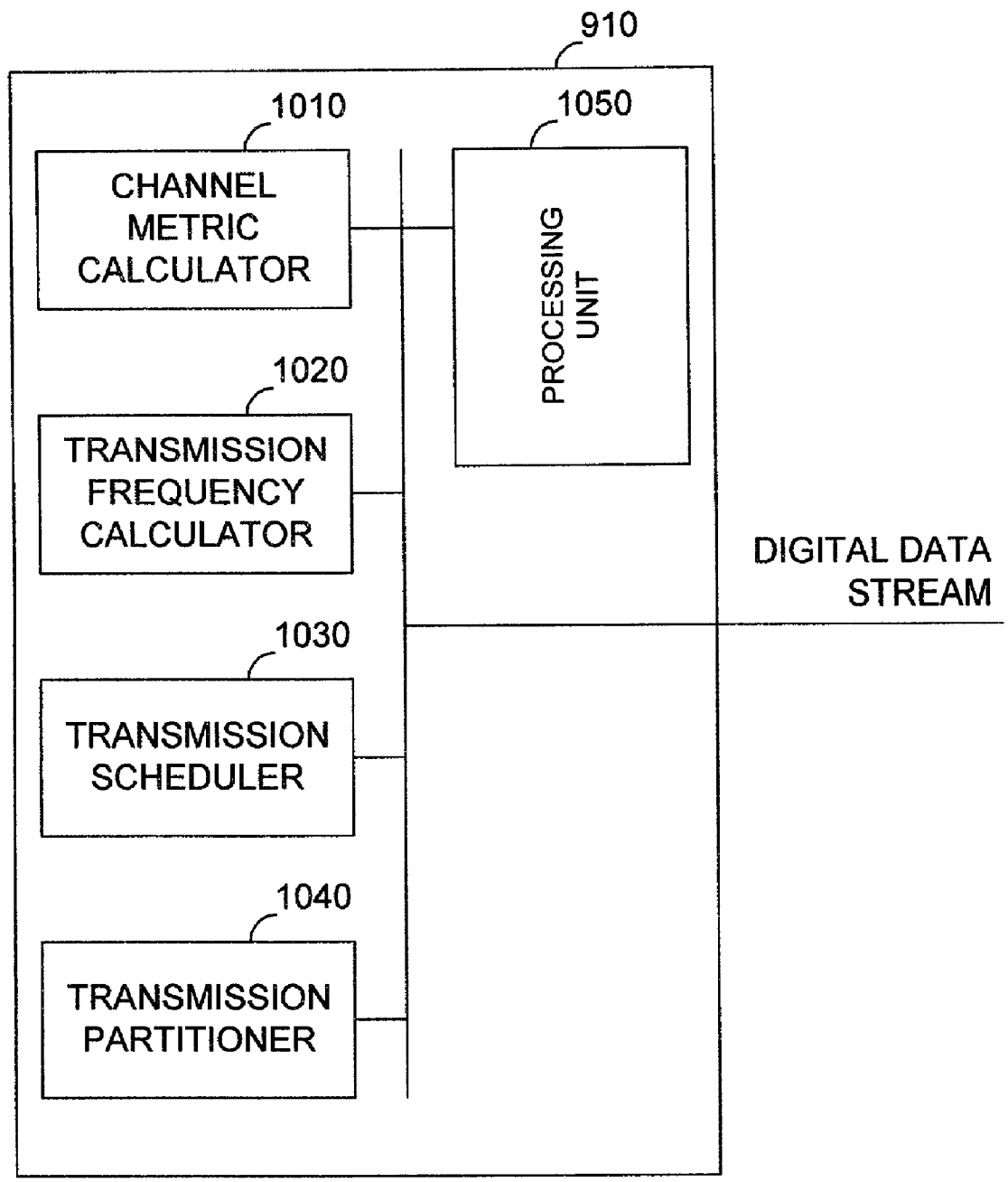
FIG. 10 illustrates a detailed view of a processor located inside a wireless unit that may be a part of a Bluetooth wireless network according to a preferred embodiment of the present invention.

Referring now to FIG. 10, a diagram illustrates a detailed view of the processor 910 in a wireless unit according to a preferred embodiment of the present invention. The processor 910 comprises a channel metric calculator 1010, a transmission frequency calculator 1020, a transmission scheduler 1030, a transmission partitioner 1040, and a processing unit 1050. Each functional block is collectively coupled to each other and externally connected devices via a common communications bus.

The channel metric calculator 1010 performs the task of taking a snapshot of the channel at a frequency band of interest and generating a metric that is representative of the quality of the channel within the frequency band. The channel metric calculator 1010 can make use of a radio receiver (not shown) within the receive path of the wireless unit to make the snapshot by tuning the receiver to the frequency band and then recording the signals received by the receiver.

The transmission frequency calculator 1020 is used to calculate the transmission frequency for the transmission time slot. It may also be used to calculate the reception frequency for the next reception time slot. Bluetooth wireless networks use a fixed frequency-hopping pattern based on the addressed of the master unit. A clock in the master unit is used to derive transmission frequency during a particular time slot.

The transmission scheduler 1030 is used to schedule transmissions based on the channel metric generated by the channel metric calculator 1010. The transmission scheduler 1030 uses the channel metric make its decision to permit or defer transmissions. If the channel metric denotes that the next transmission frequency is of poor quality, then the transmission scheduler 1030 will defer the transmission until a later time.

Working in synchrony with the transmission scheduler 1030 is the transmission partitioner 1040. The transmission partitioner 1040 partitions scheduled transmissions based on the channel metric. Depending on the channel metric, the transmission partitioner 1040 will break a long transmission into shorter packets or it may allow a long transmission to be transmitted using multiple time slots. An additional function of the transmission partitioner 1040 is the application of data encoding to protect the contents of the transmission.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for transmitting information in a wireless network operating in an environment with other wireless networks and sources of errors, noise, and interference, the method comprising:
    tuning a receiver to a frequency band of interest;
    taking a snapshot of a communications channel at the frequency band of interest;
    calculating a channel metric based on the channel snapshot;
    comparing the channel metric against a threshold; and
    performing an action based on the result of the comparison,
wherein the wireless network permits transmissions in a sequence of time slots and each time slot has a corresponding transmission frequency that is from a sequence of transmission frequencies, and wherein the sequence of transmission frequencies is specified based on an address of a master unit, wherein prior to the tuning step, the method further comprising:
    determining a current time slot; and
    determining the frequency band of interest based on the current time slot.

2. The method of claim 1, wherein the frequency band of interest is the transmission frequency associated with the time slot immediately following the current time slot.

3. The method of claim 2, wherein the performing step comprises transmitting a packet in the time slot immediately following the current time slot if the channel metric is less than the threshold.

4. The method of claim 1, wherein the frequency band of interest comprises the transmission frequencies associated with a plurality of time slots immediately following the current time slot.

5. The method of claim 4, wherein a channel metric is calculated for each time slot in the plurality of time slots, and wherein the performing step comprises transmitting a packet in the time slot selected from the plurality of time slots with the smallest channel metric.

6. The method of claim 1, wherein the performing step comprises selecting a maximum transmission packet length based on the result of the comparison.

7. The method of claim 6, wherein the transmission is partitioned into a plurality of packets with each packet being less than or equal to the maximum transmission packet length.

8. The method of claim 6, the performing step further comprises selecting a data encoding method based on the result of the comparison.

9. The method of claim 8, wherein the strength of the selected data encoding method is based on the value of the channel metric.

10. A wireless communications unit comprising:
    an antenna for receiving and transmitting signals;
    a receive path coupled to the antenna, the receive path containing circuitry to process signals received via the antenna;
    a transmit path coupled to the antenna, the transmit path containing circuitry to process signals to be transmitted by the antenna; and
    a processor coupled to the receive and transmit paths, the processor comprising:
        a channel metric calculator coupled to the receive path, the channel metric calculator containing circuitry to measure a frequency band of interest and to generate a metric based on the measurement;
        a transmission frequency calculator coupled to the transmit path, the transmission frequency calculator containing circuitry to calculate a next transmission frequency based on a clock and a current transmission frequency;
        a transmission scheduler coupled to the channel metric calculator and the transmission frequency calculator, the scheduler containing circuitry to schedule a transmission based on information generated by the channel metric calculator; and
        a transmission partitioner coupled to the transmission scheduler, the channel metric calculator and the transmission frequency calculator, the partitioner containing circuitry to determine a length of the transmission based on information generated by the channel metric calculator.

11. The wireless communications unit of claim 10, wherein the channel metric calculator continually monitors the frequency band of interest and uses information related to the frequency band to generate history information regarding the frequency band.

12. The wireless communications unit of claim 10, wherein the channel metric calculator monitors the next transmission frequency only when there is a transmission to process.

13. The wireless communications unit of claim 10, wherein the transmission scheduler can schedule a transmission only in the next transmission frequency.

14. The wireless communications unit of claim 10, wherein the transmission frequency calculator calculates a sequence of next transmission frequencies, and wherein the transmission scheduler can schedule a transmission during any transmission frequency in the sequence of next transmission frequencies.

15. A communications system comprising:
    At least two wireless communications units wirelessly coupled to each other, each wireless communications unit comprising:
        an antenna for receiving and transmitting signals;
        a receive path coupled to the antenna, the receive path containing circuitry to process signals received via the antenna;
        a transmit path coupled to the antenna, the transmit path containing circuitry to process signals to be transmitted by the antenna; and
        a processor coupled to the receive and transmit paths, the processor comprising:
            a channel metric calculator coupled to the receive path, the channel metric calculator containing circuitry to measure a frequency band of interest and to generate a metric based on the measurement;
            a transmission frequency calculator coupled to the transmit path, the transmission frequency calculator containing circuitry to calculate a next transmission frequency based on a clock and a current transmission frequency;

a transmission scheduler coupled to the channel metric calculator and the transmission frequency calculator, the scheduler containing circuitry to schedule a transmission based on information generated by the channel metric calculator; and a transmission partitioner coupled to the transmission scheduler, the channel metric calculator and the transmission frequency calculator, the partitioner containing circuitry to determine a length of the transmission based on information generated by the channel metric calculator.

16. The communications system of claim 15, wherein there is a plurality of wireless communications units, and wherein one of the wireless communications units is a master unit and the remaining wireless communications units are slave units.

* * * * *